(12) United States Patent
Parchak et al.

(10) Patent No.: US 6,795,396 B1
(45) Date of Patent: Sep. 21, 2004

(54) ATM BUFFER SYSTEM

(75) Inventors: Yochai Parchak, Raanana (IL); Yair Laster, Modi'in (IL); Zvika Menachemi, Modi'in (IL); Yacov Reshef, Hadera (IL)

(73) Assignee: Teledata Networks, Ltd., Herzliya (IL)

( * ) Notice: Subject to any disclaimer, the term of this patent is extended or adjusted under 35 U.S.C. 154(b) by 0 days.

(21) Appl. No.: 09/563,667

(22) Filed: May 2, 2000

(51) Int. Cl.[7] ................................................. H04J 1/16
(52) U.S. Cl. ............................... 370/230.1; 370/395.1; 370/429
(58) Field of Search ............................ 370/389, 395.1, 370/218, 380, 253, 392, 519, 431, 413, 398, 401, 414, 235, 403, 390, 422, 229, 231, 230.1, 429, 232, 315

(56) References Cited

U.S. PATENT DOCUMENTS

| | | | | |
|---|---|---|---|---|
| 5,457,687 A | * | 10/1995 | Newman | 370/232 |
| 5,787,072 A | * | 7/1998 | Shimojo et al. | 370/231 |
| 5,850,395 A | | 12/1998 | Hauser et al. | |
| 6,243,382 B1 | * | 6/2001 | O'Neill et al. | 370/395.1 |
| 6,584,101 B2 | * | 6/2003 | Hagglund et al. | 370/389 |
| 6,636,510 B1 | * | 10/2003 | Lee et al. | 370/390 |
| 6,646,985 B1 | * | 11/2003 | Park et al. | 370/229 |
| 6,647,019 B1 | * | 11/2003 | McKeown et al. | 370/422 |
| 6,657,962 B1 | * | 12/2003 | Barri et al. | 370/235 |

OTHER PUBLICATIONS

Unekawa et al., 1996, IEEE, Session 7: 118–119, 428, "A 5Gb/s 8 = 8 ATM Switch Element CMOS LSI Supporting Five Quality–of–Service Classes with 200MHz LVDS Interface".

Tokura et al., 1994, IEEE, pp. 75–79, "Congestion Avoidance Networks: CEFLAR".

* cited by examiner

Primary Examiner—John Pezzlo
(74) Attorney, Agent, or Firm—Blakely, Sokoloff, Taylor & Zafman LLP

(57) ABSTRACT

An ATM buffer system includes a buffer to communicate with 16 ATM ports, and the system can implement two buffers to communicate over 32 ATM ports. A flow control signal is provided between the buffers in the 32-port configuration to route a buffer status signal to an ATM matrix using overhead data. The multiple buffers communicate with the ATM matrix using a single low voltage differential signal (LVDS) transmit and receive connection.

19 Claims, 3 Drawing Sheets

ATM BUFFER SYSTEM

TECHNICAL FIELD OF THE INVENTION

The present invention relates generally to communication buffers and in particular the present invention relates to asynchronous transfer mode (ATM) buffer systems.

BACKGROUND OF THE INVENTION

An asynchronous transfer mode (ATM) network comprises a layered architecture allowing multiple services like voice, data and video, to be mixed over a network. The network includes an interface to a physical communication medium and transmitted and received data can be communicated through buffer circuits. Typically, a buffer circuit is provided that can communicate with a predetermined number of communication ports provided through the physical medium. If an increased number of communication ports is desired, a larger buffer circuit is required.

Increasing the size of a buffer circuit to accommodate possible increases in ports can be undesirable. That is, manufacturing an application specific integrated circuit with data buffers large enough for a communication bus having 32 ports, for example, requires increased circuitry and a larger package size than a circuit having a 16 port bandwidth.

For the reasons stated above, and for other reasons stated below which will become apparent to those skilled in the art upon reading and understanding the present specification, there is a need in the art for an ATM buffer system that allows for communication with more than one data bus.

SUMMARY OF THE INVENTION

The above-mentioned problems with communication buffers and other problems are addressed by the present invention and will be understood by reading and studying the following specification. Embodiments of the present invention provide an expandable buffer system. In one embodiment, the system includes buffer circuit that outputs a flow control signal to a second buffer circuit. Both buffer circuits receive data from a common data line, and the second buffer transmits data and status signals to the ATM matrix via a data line.

In one embodiment, an asynchronous transfer mode (ATM) buffer circuit comprises a first buffer coupled to communicate with a first X-ports of an ATM bus, and a second buffer coupled to communicate with a second X-ports of the ATM bus. The second buffer comprises flow control circuitry to provide a flow control signal to the first buffer.

In another embodiment, an asynchronous transfer mode (ATM) system comprises, an ATM matrix, and a first service card coupled to the ATM matrix through a first low voltage differential signal (LVDS) connection. The first service card comprises a first buffer to receive ATM cells from the ATM matrix through a second low voltage differential signal (LVDS) connection. A second service card is provided in the system that comprises a first buffer to receive ATM cells from the ATM matrix through the second low voltage differential signal (LVDS) connection, and a flow control connection to provide flow control data to the ATM matrix via the first low voltage differential signal (LVDS) connection and the first service card.

DETAILED DESCRIPTION OF THE INVENTION

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

Figure 1:
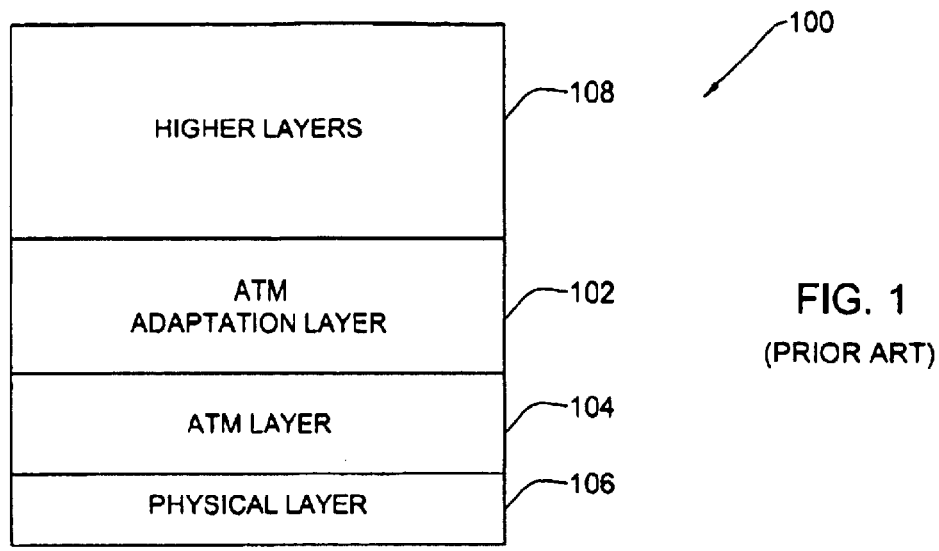
FIG. 1 illustrates a model of a prior art ATM system.

Referring to FIG. 1, a model of an ATM system 100 is described. In general, ATM is a layered architecture allowing multiple services like voice, data and video, to be mixed over a network. Three lower level layers have been defined to implement the features of ATM. An adaptation layer 102 assures appropriate service characteristics and divides all types of data into a 48-byte payload that will make up the ATM cell. An ATM layer 104 takes the data to be sent and adds a 5-byte information header that assures the cell is sent on the right connection. A physical layer 106 defines the electrical characteristics and network interfaces. This layer "puts the bits on a wire."

The physical layer 106 includes a physical medium sub-layer used to communicate the data, and a transmission convergence sub-layer. The physical medium sub-layer provides bit stream transmission capabilities including bit-timing, line-coding and optical/electrical conversion when required. The transmission convergence sub-layer adapts a flow of bits into a flow of cells or vice versa and can be separated into five successive functions: transmission frame generation/recovery; transmission frame adaptation; cell delineation; HEC header sequence generation/verification; and cell rate decoupling.

The next layer in the system is the ATM layer 104, or ATM matrix. This layer transports data passed down to it by the ATM adaptation layer (AAL) 102 to its intended destination. The ATM layer is in charge of routing cells across the network and it's functions are cell multiplexing/de-multiplexing, translation, cell header generation/extraction and at the user network interface (UNI) generic flow control. Thus, the ATM layer is the transport mechanism of the system. As stated above, the ATM cell is 53 bytes long, and 5 of the bytes are reserved for a cell header. The cell header, or overhead, includes a numerical identifier allocating it to a specific connection. The ATM layer uses information received from the AAL layer to generate the ATM header.

The AAL layer 102 segments data streams from higher application layers 108 into 48-byte units of information. In the other direction, the AAL layer reassembles data from received ATM cells and passes the data to the higher layers.

Figure 2:
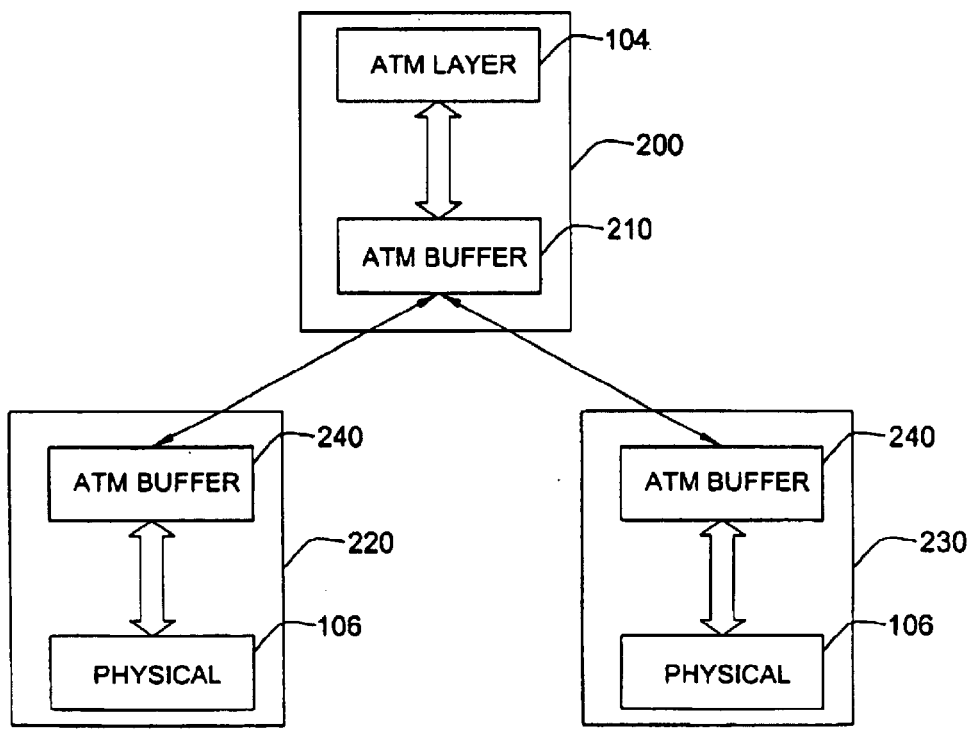
FIG. 2 illustrates a block diagram if an interface according to one embodiment of the present invention.

Embodiments of the present invention provide a communication interface between the ATM layer 104 and the physical layer 106. Referring to FIG. 2, a block diagram of one embodiment of the interface is illustrated. The interface includes a matrix card 200 that includes the ATM layer 104 and an ATM buffer circuit 210. The ATM buffer circuit 210 is configured to communicate with multiple ports, such as 32 ports. The matrix card 200 is coupled to multiple service cards 220 and 230. The service cards 220 and 230 are typically located in a physical rack in proximity to the matrix card 200, and each service card 220 and 230 includes an ATM buffer circuit 240 that is configured to communicate to multiple ports of the physical layer 106, such as 16 ports. The ATM buffer circuits 240 of service cards 220 and 230 are usually limited in ports because of the size of buffers needed per port.

Figure 3:
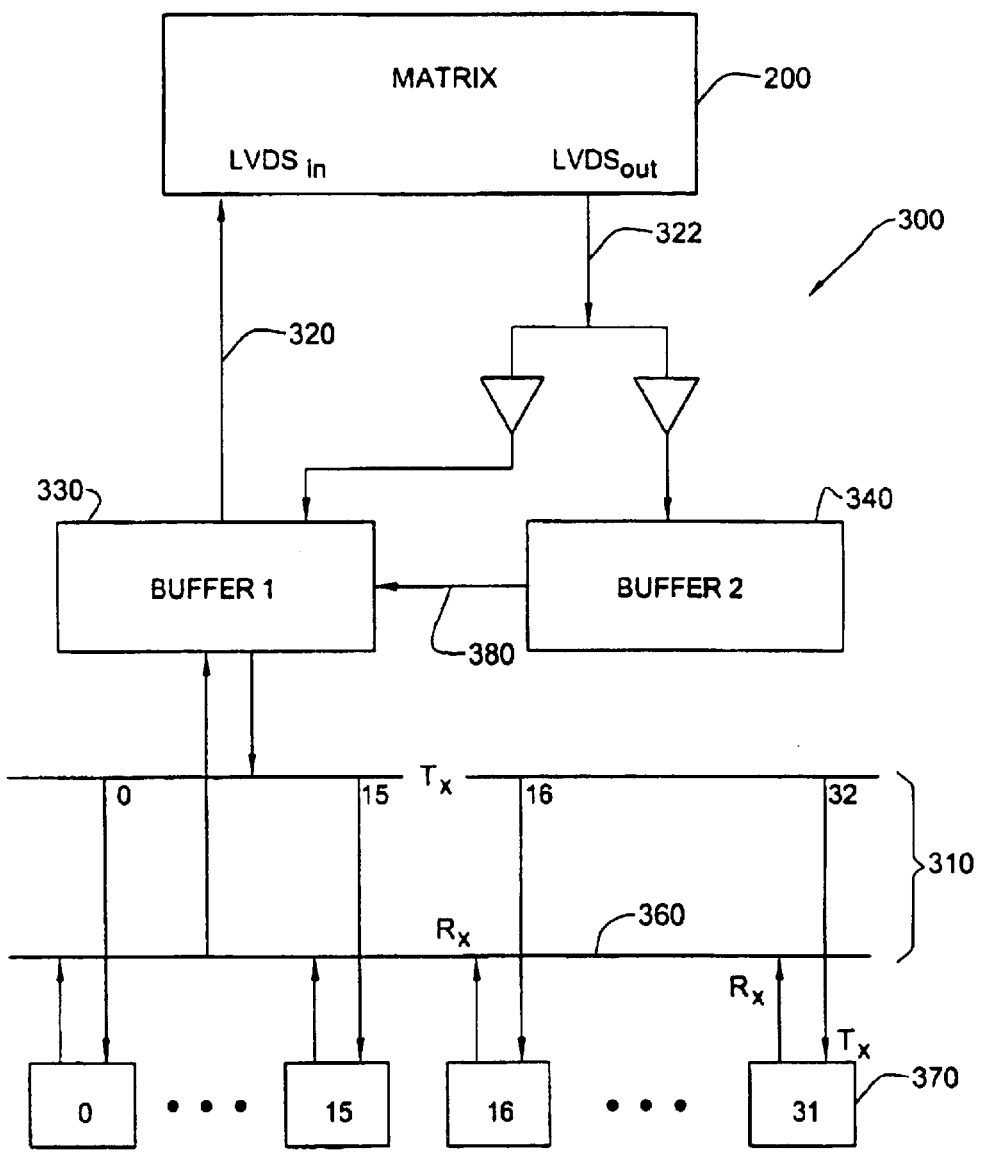
FIG. 3 is a schematic diagram of an ATM buffer system according to one embodiment of the present invention.

Referring to FIG. 3, a schematic diagram of an asynchronous transfer mode (ATM) buffer system 300 according to one embodiment of the present invention is described. The system 300 includes two ATM buffer circuits 330 and 340 connected between a Universal Test and Operations Interface for ATM (UTOPIA) bus 310 and a low voltage differential signal line (LVDS) that includes a LVDS input line and a LVDS output line coupled to communication connections 320 and 322, respectively. The first ATM buffer circuit 330 supports 16 UTOPIA transmit ports, and the second ATM buffer circuit 340 supports an additional 16 UTOPIA transmit ports. UTOPIA bus 310 is an electrical interface between the transmission convergence and physical medium sub-layers of the physical layer. Further, a UTOPIA interface can also be used between the ATM layer and the physical layer.

LVDS node 322 is multiplied into the two ATM buffer circuits. Each ATM buffer circuit 330 and 340 discards data cells that are not assigned to the ports of that ATM buffer. Data received on the UTOPIA RX bus 360 is routed through ATM buffer circuit 330 to a single LVDS connection 320. As such, the first ATM buffer circuit 330 has a UTOPIA RX address range of 0 to 31 and a UTOPIA TX address range of 0 to 15. The second ATM buffer circuit 340 does not have an assigned UTOPIA RX address range, but has a UTOPIA TX address range of 16 to 31. FIG. 3 illustrates 32 modems 370 coupled to the physical layer and in communication with the ATM buffer circuits 330 and 340.

In operation, a status of data flow through the second ATM buffer circuit 340 is provided via a flow control signal 380 to the first ATM buffer circuit for communication on the LVDS output node 320. This arrangement allows the ATM matrix 200 to monitor the data flow through the second ATM buffer circuit 340.

Figure 4:
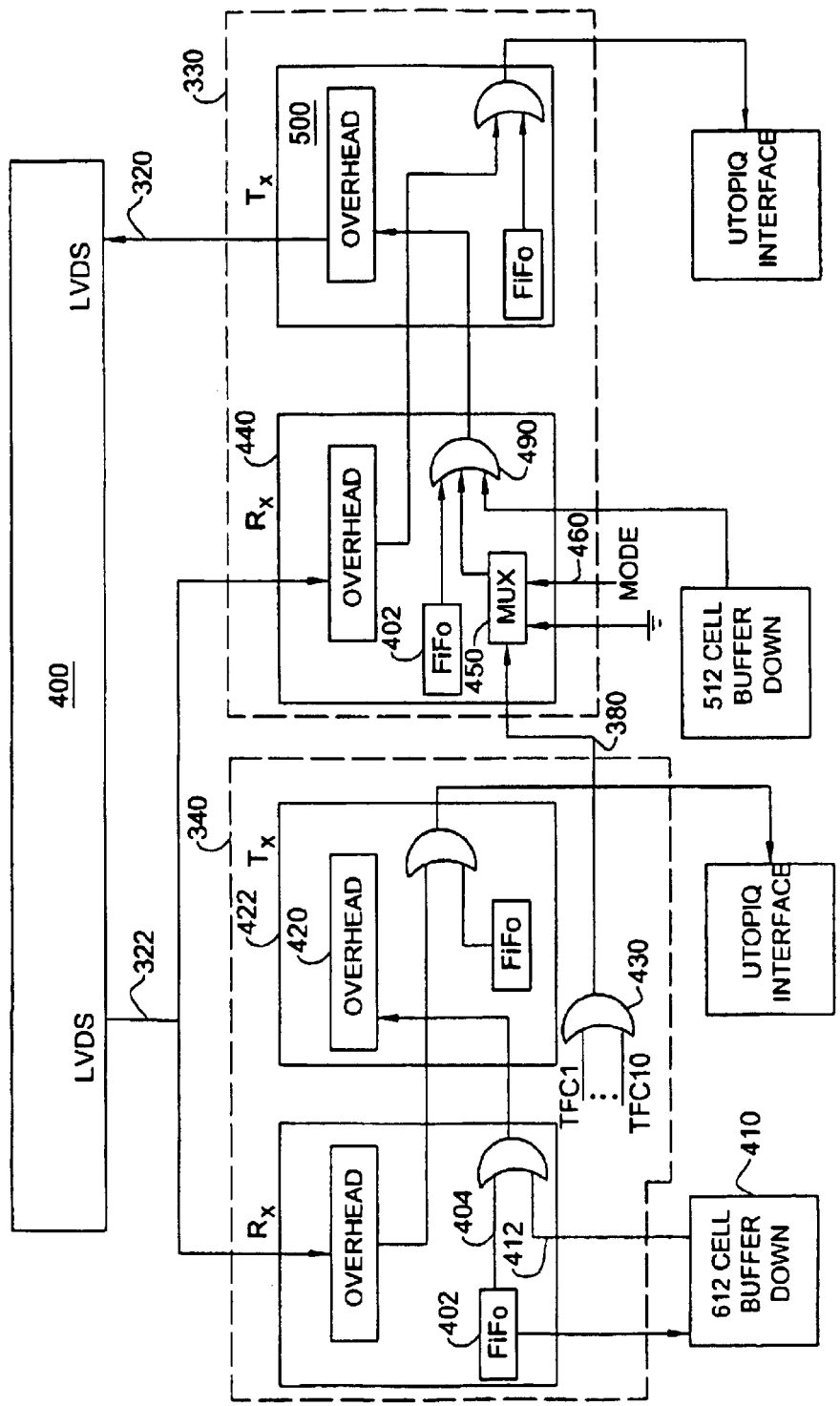
FIG. 4 is a more detailed illustration of a schematic diagram of an ATM buffer system according to one embodiment of the present invention.

FIG. 4 provides a more detailed diagram of the buffer circuit of one embodiment of the present invention. The buffer circuit includes first buffer 330 and second buffer 340. The second buffer 340 includes a flow control signal 380 that is coupled to the first buffer 330. In one embodiment, each buffer 330 and 340 is embodied in a service card.

The second buffer circuit 340 has a receive FIFO buffer 402 to receive data from the LVDS connection 322. This 8-cell FIFO buffer 402 is configured to generate an "almost full" signal 404 to indicate that additional data cannot be handled. The FIFO buffer 402 is coupled to a 512 cell buffer down circuit 410 that is also configured to generate a status signal 412. The buffer down circuit 410 is used to store cells when the ATM physical layer is not ready and thus absorbs peak cell rates. These signals 404 and 412 are coupled to the overhead circuit 420 of a transmit buffer circuit 422. The overhead circuit 420 generates overhead data of the ATM cells (TxFC0 to TxFC10) that is coupled through flow control circuitry 430 to the flow control connection 380 and to the first buffer circuit 330.

The first buffer circuit 330 includes the same FIFO circuitry 402 in its receive buffer 440. The flow control from the second buffer circuit 340 is combined with the flow control from the first buffer circuit 330 and inserted into the overhead of cells transmitted to the ATM matrix 400. Each buffer circuit 330 and 340 is identical and includes a multiplex circuit 450. In the first buffer circuit 330, the multiplex circuit 450 is enabled using a mode signal 460 which indicates that the second buffer circuit 340 is implemented in the system. If multiple buffers are not implemented, the output connection of the multiplex circuit 450 would be coupled to a ground connection. Flow control circuit 490 processes the flow control signals and provides them to the overhead circuit of the transmit buffer 500.

In operation, the main card 400 requests a flow control status from the first and second buffers 330 and 340. In response, the first and second buffers 330 and 340 transmit to the main card 400 the status of the buffer circuits 402 in the data overhead. Because the system uses one LVDS communication connection in each communication direction, the second buffer 340 routes status information through the first buffer 330.

Conclusion

An embodiment of an ATM buffer system has been described that includes a buffer to communicate with ATM ports. In one embodiment, the system is configured to implement two buffers to communicate over 32 ATM ports. A flow control signal is provided between the buffers in the 32-port configuration to route the buffer status to an ATM matrix using overhead data. The multiple buffers communicate with the ATM matrix using a single LVDS transmit and receive connection.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An asynchronous transfer mode (ATM) buffer circuit comprising: a first buffer coupled to communicate with a first X-ports of an ATM bus; and a second buffer coupled to communicate with a second X-ports of the ATM bus, the second buffer comprises flow control circuitry to provide a flow control signal to the first buffer; wherein the first and second X-ports are each 16-ports of the ATM bus.

2. An asynchronous transfer mode (ATM) buffer circuit comprising: a first buffer coupled to communicate with a first X-ports of an ATM bus; and a second buffer coupled to communicate with a second X-ports of the ATM bus, the second buffer comprises flow control circuitry to provide a flow control signal to the first buffer wherein the first buffer is coupled to an ATM matrix via a low voltage differential signal (LVDS) connection to communicate the flow control signal to the ATM matrix.

3. The ATM buffer of claim 2 wherein the flow control signal is communicated from the first buffer to the ATM matrix in overhead data of ATM cells.

4. The ATM buffer of claim 2 wherein the first and second buffers are coupled to receive ATM cells on a common low voltage differential signal (LVDS) connection.

5. An asynchronous transfer mode (ATM) buffer circuit comprising: a first buffer coupled to communicate with a first X-ports of an ATM bus; and a second buffer coupled to communicate with a second X-ports of the ATM bus, the second buffer comprises flow control circuitry to provide a flow control signal to the first buffer; wherein the ATM bus is a Universal Test and Operations Interface for ATM (UTOPIA).

6. An asynchronous transfer mode (ATM) system comprising:
   an ATM matrix;
   a first service card coupled to the ATM matrix through a first low voltage differential signal (LVDS) connection, the first service card comprising a first buffer to receive ATM cells from the ATM matrix through a second low voltage differential signal (LVDS) connection; and
   a second service card comprising a second buffer to receive ATM cells from the ATM matrix through the second low voltage differential signal (LVDS) connection, and a flow control connection to provide flow control data to the ATM matrix via the first low voltage differential signal (LVDS) connection and the first service card.

7. The ATM system of claim 6 wherein the first service card is coupled to 16 ports of an ATM physical layer.

8. The ATM system of claim 7 wherein the first service card is coupled to the ATM physical layer through 16 ports of a Universal Test and Operations Interface for ATM (UTOPIA).

9. The ATM system of claim 6 wherein the second service card is coupled to 16 ports of an ATM physical layer.

10. The ATM system of claim 9 wherein the first service card is coupled to the ATM physical layer through 16 ports of a Universal Test and Operations Interface for ATM (UTOPIA).

11. The ATM system of claim 6 wherein the flow control data communicated to the ATM matrix is provided in overhead data of ATM cells.

12. The ATM system of claim 6 wherein the flow control data indicates an available capacity of the second buffer of the second service card.

13. An asynchronous transfer mode (ATM) service card comprising: a data buffer; an input connection to receive flow control signals indicating a status of an external buffer circuit; flow control circuitry; an output connection coupled to the flow control circuitry to communicate the flow control signals to an ATM matrix; and multiplex circuit coupled to the input connection, wherein the multiplex circuit selectively couples the flow control signals to the flow control circuitry.

14. An asynchronous transfer mode (ATM) service card comprising: a data buffer; an input connection to receive flow control signals indicating a status of an external buffer circuit; flow control circuitry; and an output connection coupled to the flow control circuitry to communicate the flow control signals to an ATM matrix; wherein the data buffer is configured to communicate with 16 ports of an ATM communication bus.

15. An asynchronous transfer mode (ATM) service card comprising: a data buffer; an input connection to receive flow control signals indicating a status of an external buffer circuit; flow control circuitry; and an output connection coupled to the flow control circuitry to communicate the flow control signals to an ATM matrix; and overhead circuitry wherein the flow control signals are communicated to the ATM matrix in ATM overhead data.

16. A method of operating an asynchronous transfer mode (ATM) buffer circuit comprising: generating a first flow control signal using a first buffer circuit; outputting the first flow control signal from the first buffer circuit; receiving the first flow control signal from the first buffer circuit with a second buffer circuit; and outputting the first flow control signal from the second buffer circuit; wherein the flow control signal is output from the second buffer circuit in overhead data of ATM data cells.

17. A method of operating an asynchronous transfer mode (ATM) buffer circuit comprising: generating a first flow control signal using a first buffer circuit; outputting the first flow control signal from the first buffer circuit; receiving the first flow control signal from the first buffer circuit with a second buffer circuit; and outputting the first flow control signal from the second buffer circuit; generating a second a second flow control signal using the second buffer circuit; and outputting the second flow control signal from the second buffer circuit.

18. A method of operating an asynchronous transfer mode (ATM) buffer circuit, the method comprising:
   sending a flow control status request from an ATM matrix to first and second buffer circuits;
   generating a first flow control signal indicating a status of the first buffer circuit;
   coupling the first flow control signal from the first buffer to the second buffer;
   generating a second flow control signal indicating a status of the second buffer circuit; and
   transmitting the first and second flow control signals from the second buffer circuit to the ATM matrix.

19. The method of claim 18 wherein the first and second flow control signals are transmitted to the ATM matrix in overhead data of ATM data cells.

* * * * *